US011118271B2

(12) United States Patent
Brouwer et al.

(10) Patent No.: US 11,118,271 B2
(45) Date of Patent: Sep. 14, 2021

(54) CONVEYOR FRAME TREATMENT FOR SUPPRESSING PHOSPHATE DRAGGING RESULTING FROM THE PLANT DESIGN IN A DIP COATING PROCESS SEQUENCE

(71) Applicant: Henkel AG & Co. KGaA, Duesseldorf (DE)

(72) Inventors: Jan-Willem Brouwer, Willich (DE); Frank-Oliver Pilarek, Cologne (DE); Fernando Jose Resano Artalejo, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 180 days.

(21) Appl. No.: 16/149,428

(22) Filed: Oct. 2, 2018

(65) Prior Publication Data

US 2019/0032223 A1 Jan. 31, 2019

Related U.S. Application Data

(63) Continuation of application No. PCT/EP2017/058994, filed on Apr. 13, 2017.

(30) Foreign Application Priority Data

Apr. 15, 2016 (DE) .......................... 102016206417.7

(51) Int. Cl.
| | |
|---|---|
| *C23C 28/04* | (2006.01) |
| *C23C 22/73* | (2006.01) |
| *C09D 5/44* | (2006.01) |
| *C25D 13/20* | (2006.01) |
| *C25D 13/04* | (2006.01) |
| *C25D 13/02* | (2006.01) |
| *C25D 13/22* | (2006.01) |
| *C23C 22/83* | (2006.01) |
| *C23C 22/07* | (2006.01) |
| *C23G 1/24* | (2006.01) |

(52) U.S. Cl.
CPC ............ C23C 28/04 (2013.01); C09D 5/4488 (2013.01); C23C 22/73 (2013.01); C23C 22/83 (2013.01); C25D 13/02 (2013.01); C25D 13/04 (2013.01); C25D 13/20 (2013.01); C25D 13/22 (2013.01); *C23C 22/07* (2013.01); *C23G 1/24* (2013.01)

(58) Field of Classification Search
CPC ......... C23C 28/04; C23C 22/73; C23C 22/83; C23C 22/07; C23C 2222/10; C23C 22/365; C23C 22/60; C23C 22/364; C23C 22/12; C23C 22/78; C23C 22/00; C23C 22/362; C09D 5/4488; C09D 5/44; C25D 13/02; C25D 13/04; C25D 13/20; C25D 13/22; C25D 13/12; C25D 17/06; C25D 17/005; C25D 17/28; C23G 1/24; C23G 3/00; C23F 11/188; C23F 11/184; B65G 49/0477; B65G 39/08; B65G 49/0413; B62D 65/18; Y10T 428/12799
See application file for complete search history.

(56) References Cited

U.S. PATENT DOCUMENTS

| | | | |
|---|---|---|---|
| 3,695,942 A | 10/1972 | Binns | |
| 4,746,416 A | 5/1988 | Jacob | |
| 2009/0250346 A1* | 10/2009 | Weschke | ............... B62D 65/18 204/471 |

FOREIGN PATENT DOCUMENTS

| | | |
|---|---|---|
| AT | 202931 B | 4/1959 |
| CN | 1179183 A | 4/1998 |
| DE | 2850977 A1 | 5/1979 |
| DE | 4017187 A1 | 12/1991 |
| DE | 19616502 A1 | 11/1996 |
| DE | 69210712 T2 | 12/1996 |
| DE | 19606017 A1 | 8/1997 |
| DE | 19834796 A1 | 2/2000 |
| DE | 102005043031 A1 | 3/2007 |
| DE | 102008023444 A1 | 11/2009 |
| DE | 102008038653 A1 | 3/2010 |
| EP | 0376222 A1 | 7/1990 |
| EP | 0410497 A1 | 1/1991 |
| EP | 2215285 A1 | 8/2010 |
| EP | 2503025 A1 | 9/2012 |
| WO | 9856963 A1 | 12/1998 |
| WO | 2014074234 A1 | 5/2014 |

OTHER PUBLICATIONS

International Search Report for PCT/EP2017/058994, dated Jul. 27, 2017.
International Search Report for PCT/EP2017/058995, dated Jul. 27, 2017.
German Search Report for DE 102016206417.7, dated Jan. 16, 2017.
German Search Report for DE 102016206418.5, dated Jan. 16, 2017.
Straehle, J., Schweda, E., Jander/Biasius, "Lehrbuch der analytischen und praeparativen anorganischen Chiemie", 15., ueberard. Aufl., Leipzig: S. Hirzel, 2002. pp. 336-340. ISBN 3-7776-1146-8. Cited in German Search Reports for DE 102016206417.7 and DE 102016206418.5. English abstract not available.

* cited by examiner

*Primary Examiner* — Xiuyu Tai
(74) *Attorney, Agent, or Firm* — Mary K. Cameron

(57) ABSTRACT

A method for the preliminary treatment against corrosion of a plurality of metallic components, in which dragging of water-soluble phosphates from an acid passivation process using water-dissolved phosphates as the active components, e.g. a phosphating process, into the dip coating treatment stage, is effectively prevented.

7 Claims, No Drawings

CONVEYOR FRAME TREATMENT FOR SUPPRESSING PHOSPHATE DRAGGING RESULTING FROM THE PLANT DESIGN IN A DIP COATING PROCESS SEQUENCE

The present invention relates to a method for anti-corrosion pretreatment of a plurality of metal structural components, in which the carryover of water-soluble phosphates from an acid passivation, which passivation comprises phosphates dissolved in water as the active component and can in particular be phosphating, is effectively prevented in the dip-coating treatment step. In the method according to the invention, a structural component is guided, by means of a conveying frame, through all the treatment steps of the pretreatment line, and the transport pair consisting of the structural component and the conveying frame is separated only after the dip-coating and for the purpose of delivering the pretreated structural component to the baking step, and the conveying frame is thus released in order to again receive a structural component to be pretreated. The method according to the invention now provides that, in a separate process step that only provides for the treatment of the conveying frames, at least the part of the conveying frames that had previously been brought into contact, during the acid passivation, with the aqueous treatment solution containing water-soluble phosphates is now brought into contact, for the purpose of conditioning, with an acidic aqueous agent containing water-soluble compounds of the elements iron, aluminum, calcium, magnesium, zinc, chromium(III), titanium and/or zirconium in a total amount of at least 0.1 g/kg based on the agent. This occurs, according to the invention, after the transport pair has been separated in order for the pretreated structural component to be delivered to the baking step, and thus after the conveying frame is released in order to again receive a structural component to be pretreated.

The anti-corrosion pretreatment of metal structural components, in particular consisting of the materials zinc, iron, steel, zinc-plated steel and/or aluminum, in a process sequence comprising an acid passivation based on water-soluble phosphates followed by dip-coating, has been established in the prior art for decades. In this case, the acid passivation can result in the formation of a crystalline phosphate layer according to EP 2503025, or simply the formation of an amorphous phosphate-containing coating, for example within the context of zirconium phosphating according to EP 2215285. The metal structural components passivated in this manner are usually transferred to the dip-coating treatment step immediately after being rinsed. The sole purpose of the rinsing step interposed between the passivation and the subsequent dip-coating is to remove the active components of the passivation contained in the wet film adhering to the structural component in order to obtain a reproducible surface, optionally to recycle said active components into the preceding treatment step, and to minimize what is known as "dragover", i.e. the degree to which said active components are carried over into the dip-coating. Problems are frequently associated in particular with active components from preceding treatment steps in the process sequence being carried over into the dip-coating, since the stability of the dipping bath and the composition thereof can have a direct negative influence both on the quality and reproducibility of the dip-coating and on the process control when baking the paint. This applies in particular to dissolved phosphates being carried over, which phosphates in the dip-coating can, on the one hand, influence the deposition characteristics of the dispersed paint components, in particular in the case of electrophoretic dipping paints, and on the other hand the effective concentration of essential catalysts/cross-linking agents based on selected heavy metals for the subsequent curing of the dipping paint can be reduced by precipitation reactions. Dissolved phosphates being carried over can result in increased baking temperatures for the dipping paint. Increased baking temperatures when dissolved phosphates are carried over can be observed in particular in the case of dipping paints that contain water-soluble salts of yttrium and/or bismuth in addition to the dispersed resin. Although the carryover of dissolved phosphates can be easily controlled in pretreatment lines of this kind by means of a cascade of intermediate rinsing cycles, it has not yet been possible to completely eliminate the phenomenon of carryover in the types of facilities in which the structural components to be pretreated are guided by a conveying frame through all the treatment steps of an above-described pretreatment line before the wet-chemically pretreated structural component is separated from the conveying frame and made available for the baking step that provides the drying, film-formation and curing of the dipping paint, while the released conveying frame receives a further structural component to be pretreated in order to again guide said structural component through all the treatment steps. This procedure is repeated during the quasi-continuous operation of a pretreatment line until maintenance has to be carried out on the conveying frames and said frames are mechanically released from the adhering paint coagulate before they can be used again for receiving the structural components to be pretreated. In facilities of this kind, it has been found that the carryover of dissolved phosphates increases almost continuously during the conveying frame maintenance interval, and therefore, despite the provision of intermediate rinsing to the detriment of cost-effectiveness of a pretreatment line of this kind, disadvantages of high baking temperatures of the dipping paint can be overcome only by very short conveying frame maintenance intervals. The object of the present invention is therefore that of improving the cost-effectiveness of a method of this kind for anti-corrosion pretreatment of structural components in series.

This object is achieved by a method for anti-corrosion pretreatment of a plurality of metal structural components in series, comprising at least one acid passivation based on an aqueous treatment solution containing dissolved phosphates, and dip-coating, each as wet-chemical treatment steps, the treatment step of dip-coating always following that of acid passivation in the process sequence for anti-corrosion pretreatment, in which each structural component to be pretreated from the batch is received by a conveying frame, the transport pair consisting of the structural component and the conveying frame is then guided through the wet-chemical treatment steps according to the process sequence, and the transport pair is separated and a pretreated structural component is discharged only after the final treatment step, and subsequently the conveying frame thus released receives a following structural component to be pretreated from the batch in order to pass through the process sequence again for the purpose of anti-corrosion pretreatment of this structural component, the conveying frame passing through the process sequence as often as is required in order to carry out anti-corrosion pretreatment of the plurality of structural components, and at least a part of each conveying frame being brought into contact, during the wet-chemical treatment steps, both with the acid passivation and with the dip-coating, characterized in that at least the part of each conveying frame, released following the last treatment step, that had previously been brought into contact, during the acid passivation, with the aqueous treatment solution containing dissolved phosphates is brought into contact, for the purpose of conditioning and before receiving a subsequent structural component to be pretreated, with an acidic aqueous agent containing water-soluble compounds of the elements iron, aluminum, calcium, magnesium, zinc, chromium(III), titanium and/or zirconium in a total amount of at least 0.1 g/kg based on the agent.

In a method of this kind according to the invention, anti-corrosion pretreatment of the metal structural components is carried out, while carryover of dissolved phosphate from the acid passivation into the dip-coating by the conveying frames is effectively suppressed. Since, in the method according to the invention, each conveying frame repeatedly passes through the dip-coating, a paint coagulate having a significant layer thickness accumulates on the regions of the conveying frame that repeatedly come into contact with the dipping paint without subsequently being baked. However, in the method according to the invention, the absorption capacity of the adhering paint coagulate for dissolved phosphate is minimized by the conveying frames themselves being treated with the acidic aqueous agent for the purpose of conditioning after the wet-chemically pretreated structural components, which are coated with a still unbaked dipping paint, have been delivered and before a new structural component to be pretreated has been received. This surprisingly causes the paint coagulate adhering to the conveying frame to absorb the active components, and results in the absorbed dissolved phosphate being immobilized, during the acid passivation of the subsequent process sequence for anti-corrosion pretreatment of a subsequent structural component, in the paint coagulate adhering to the conveying frame. The phosphate thus immobilized is not released in the subsequent dip-coating. Thus, the carryover of dissolved phosphates that is usually caused by the conveying frames is significantly reduced, and therefore the quality of the dip-coating does not deteriorate during the course of the pretreatment of structural components in series, and/or the baking temperature of the paint does not have to be increased on account of the precipitation of cross-linking catalysts such as yttrium and/or bismuth.

A series pretreatment according to the present invention occurs when a plurality of metal structural components pass through the wet-chemical treatment steps of the process sequence for anti-corrosion pretreatment, each structural component passing through the individual treatment steps of the process sequence in a manner temporally offset from one another.

A metal structural component within the meaning of the present invention is present when the structural component is composed at least in part of at least one metal material, preferably zinc, iron, aluminum and the respective alloys, provided that the above-mentioned elements in each case form the main alloy component at more than 50 at. %, and of zinc-plated steel.

An acid passivation within the meaning of the present invention denotes a wet-chemical treatment step in the course of which a phosphate-containing passivating coating is formed. For this purpose, the acid passivation is based on an aqueous agent having a pH of less than 7 and containing dissolved phosphate, dissolved phosphate in water being present in the form of hydrated compounds that are a source of phosphate ions.

Dip-coating within the meaning of the present invention denotes a wet-chemical treatment step in the course of which a curable paint coagulate is deposited on the metal structural component and is then formed into a film and cured by baking in a subsequent treatment step. For this purpose, the dip-coating is based on an aqueous agent containing at least one dispersed organic resin in an amount of at least 1 wt. % based on the aqueous agent. In a preferred embodiment, the dipping paint can be electrophoretically deposited, in a particularly preferred embodiment by applying a current, the metal structural component being connected as the cathode. In the latter case, this is cathodic dip-coating, in which an alkaline pH-shift at the interface to the metal structural component causes coagulation of the dispersed resin particles, and thus layer-formation on the structural component. It has been found that in particular the paint coagulate from cathodic dip-coating promotes the absorption of dissolved phosphate. It is possible that, in this case, the positive zeta potential of the resin particles or the positive charge density in the polymer is responsible for the comparatively high absorption capacity and the resultant increased tendency for dissolved phosphate to be carried over into the dip-coating by the paint coagulate adhering to the conveying frame.

In a particular embodiment of the method according to the invention, the preferred dip-coating is cathodic dip-coating, preferably at least one water-soluble compound of the element bismuth and/or yttrium being contained in addition to the dispersed resin. Precisely these elements have a tendency, in the presence of dissolved phosphate, to form slightly soluble salts, and therefore the result of dip-coating of this kind depends to a significant extent on the carryover of dissolved phosphates.

Within the meaning of the present invention, a process sequence for anti-corrosion pretreatment comprises a specified sequence of wet-chemical treatment steps from the structural component to be pretreated being received by the conveying frame to the now pretreated structural component being removed in order to be delivered to the baking step, each individual wet-chemical treatment step providing for the structural component and at least parts of the conveying frame to be brought into contact with an aqueous agent.

A conveying frame within the meaning of the present invention denotes a frame for transporting the structural components through all the wet-chemical treatment steps, which steps are spatially separate from one another, in accordance with the process sequence according to the invention. The frame can be of any spatial design that permits it to receive and transport the structural component. The conveying frame and the structural component to be pretreated form a transport pair for the duration of the process sequence. When the process sequence has ended, the pretreated structural component is removed and made available for the baking step ("discharging"); as soon as the pretreated structural component has been removed, the conveying frame is released again and can receive a further structural component to be pretreated. Generally, for reasons of economy of method, it is preferred to use a plurality of conveying frames for the quasi-continuous treatment of a plurality of structural components in series. Preferably, the number of conveying frames corresponds at least to the number of wet-chemical treatment steps.

In a preferred embodiment of the method according to the invention, the acidic aqueous agent for conditioning a released conveying frame contains at least water-soluble compounds of the elements iron and/or aluminum, preferably of the element iron, particularly preferably water-soluble iron(III) compounds, the amount of iron and/or aluminum in each case preferably being at least 0.1 g/kg based on the agent.

According to the invention, it is also preferred for the acidic aqueous conditioning agent to contain at least water-soluble compounds of the element iron and for the pH of the agent to be no more than 3.0.

Within the meaning of the present invention, compounds are "water-soluble" when the solubility thereof in deionized water having a conductivity of no more than 1 $\mu Scm^{-1}$ at a temperature of 20° C. is at least 1 g/l.

It is preferable, in particular, for the acidic aqueous conditioning agent to be substantially free of dissolved phosphates. This is intended to mean that less than 100 mg/kg, preferably less than 50 ppm, dissolved phosphates, calculated as $PO_4$, are contained in the agent.

Furthermore, it is preferred, so as to preserve the effect of the separate treatment of the conveying frame in order to suppress the carryover of dissolved phosphate, for the treatment step of acid passivation to be preceded by cleaning/degreasing of this kind as a wet-chemical treatment step within the process sequence for anti-corrosion pretreatment of structural components in series, in which the cleaning and degreasing is carried out based on aqueous cleaning solutions, the pH of which is above 6, preferably above 8, particularly preferably above 10. This ensures that the paint coagulate adhering to the conveying frame and the active components from treating the conveying frame that are contained in said paint coagulate remain in the paint coagulate and are not released into the cleaning/degreasing.

Moreover, it is conventional, and therefore preferred, for the baking of the dipping paint in order to form a cured paint coating to follow on from the process sequence for anti-corrosion pretreatment of a plurality of structural components in series in the method according to the invention, preferably again conveying frames, but not conveying frames of the kind associated with the process sequence for anti-corrosion pretreatment, receiving the pretreated structural components and transferring said components to the baking step and optionally subsequent steps for further coating.

The invention claimed is:

1. A method for an anti-corrosion pretreatment of a plurality of metal structural components, comprising a first structural component and a following structural component, in series comprising:
    a process sequence of the anti-corrosion pretreatment comprising steps of:
        at least one acid passivation step, based on an aqueous treatment solution containing dissolved phosphates; and
        a dip-coating step, based on an aqueous agent containing at least one dispersed organic resin, wherein the steps of the process sequence are wet-chemical treatment steps, and the dip-coating step follows the at least one acid passivation step in the process sequence;
    wherein the method further comprises:
        receiving the first structural component of the plurality of metal structural components to be pretreated in series on a conveying frame, thereby forming a transport pair consisting of the first structural component and the conveying frame;
        moving the transport pair through the wet-chemical treatment steps according to the process sequence thereby forming a pretreated structural component and contacting at least a part of the conveying frame with the aqueous treatment solution containing dissolved phosphates and the aqueous agent containing at least one dispersed organic resin;
        when the process sequence has ended, separating the transport pair thereby discharging the pretreated structural component and releasing the conveying frame;
        receiving a following structural component to be pretreated from the plurality of metal structural components on the released conveying frame, in order to pass through the process sequence again to pretreat the following structural component;
        wherein prior to receiving the following structural component, bringing the released conveying frame into contact with an acidic aqueous conditioning agent containing a water-soluble compound of iron, aluminum, calcium, magnesium, zinc, chromium (III), titanium or zirconium in a total amount of at least 0.1 g/kg based on the agent.

2. The method according to claim 1, wherein the at least one acid passivation step is preceded by a cleaning/degreasing step within the process sequence for anti-corrosion pretreatment of the plurality of metal structural components in series, the cleaning/degreasing being carried out based on an aqueous cleaning solution having a pH of above 6.

3. The method according to claim 1, wherein the acidic aqueous conditioning agent contains water-soluble compounds of iron, water-soluble compounds of aluminum or combinations thereof, present in an amount of at least 0.1 g/kg based on the agent.

4. The method according to claim 1, wherein the acidic aqueous conditioning agent contains water-soluble compounds of the element iron and the pH of the agent is no more than 3.0.

5. The method according to claim 1, wherein the dip-coating step is a cathodic dip-coating that contains at least one water-soluble compound of bismuth, at least one water-soluble compound of yttrium or combinations thereof, in addition to the at least one dispersed organic resin.

6. The method according to claim 2, further comprising a baking step, after the process sequence, the baking step comprising:
    receiving the pretreated structural components on conveying frames for baking, different from the conveying frames associated with said process sequence;
    transferring the pretreated structural components on the conveying frames for baking to the baking step; and
    baking as-deposited dip-coating on the pretreated structural components thereby forming a cured paint coating.

7. The method according to claim 6, wherein the aqueous cleaning solution of the cleaning/degreasing step has a pH of greater than 8; and the acidic aqueous conditioning agent has a pH of no more than 3.0 and contains water-soluble compounds of iron, water-soluble compounds of aluminum or combinations thereof, present in an amount of at least 0.1 g/kg based on the agent; and wherein the dip-coating step is a cathodic dip-coating that contains at least one water-soluble compound of the element bismuth, at least one water-soluble compound of yttrium or combinations thereof, in addition to the at least one dispersed organic resin.

* * * * *